(12) United States Patent
Chautru

(10) Patent No.: US 10,771,399 B2
(45) Date of Patent: Sep. 8, 2020

(54) QUALITY OF SERVICE-AWARE PROCESSING OF DECODING TASKS

(71) Applicant: Intel Corporation, Santa Clara, CA (US)

(72) Inventor: Nicolas Chautru, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 108 days.

(21) Appl. No.: 16/048,964

(22) Filed: Jul. 30, 2018

(65) Prior Publication Data

US 2020/0036651 A1 Jan. 30, 2020

(51) Int. Cl.
*G06F 15/16* (2006.01)
*H04L 12/927* (2013.01)
*H04L 12/24* (2006.01)

(52) U.S. Cl.
CPC ........ *H04L 47/805* (2013.01); *H04L 41/0806* (2013.01); *H04L 41/12* (2013.01)

(58) Field of Classification Search
USPC ....................................................... 709/227
See application file for complete search history.

(56) References Cited

U.S. PATENT DOCUMENTS

| | | | | |
|---|---|---|---|---|
| 7,068,601 B2* | 6/2006 | Abdelilah | ........... | H04L 12/6418 370/231 |
| 7,346,000 B1* | 3/2008 | Srinivasan | ........... | H04L 41/0896 370/235 |
| 7,680,628 B1* | 3/2010 | Becker | ........... | G06F 11/3442 702/183 |
| 7,855,966 B2* | 12/2010 | Abdelilah | ........... | H04L 12/6418 370/232 |
| 7,917,573 B2* | 3/2011 | Pytel | ........... | G06F 11/3442 709/201 |
| 8,068,545 B2* | 11/2011 | Penna | ........... | H04N 19/433 375/240.25 |
| 8,909,128 B2* | 12/2014 | Ellis | ........... | G11B 20/10527 369/7 |
| 8,949,840 B1* | 2/2015 | Pulford | ........... | G06F 9/4887 718/103 |
| 9,060,015 B2* | 6/2015 | Lawn | ........... | H04L 65/80 |
| 9,372,730 B1* | 6/2016 | Pulford | ........... | G06F 9/4887 |
| 9,942,580 B2* | 4/2018 | Fryer | ........... | H04N 21/2402 |
| 2007/0030833 A1* | 2/2007 | Pirzada | ........... | H04L 41/0896 370/338 |
| 2014/0108663 A1* | 4/2014 | Peters | ........... | H04L 47/70 709/226 |
| 2016/0191406 A1* | 6/2016 | Xiao | ........... | H04L 45/38 370/235 |
| 2016/0381027 A1* | 12/2016 | Mitchell | ........... | H04W 12/02 726/3 |
| 2019/0173765 A1* | 6/2019 | Bertran | ........... | G06F 16/254 |

* cited by examiner

*Primary Examiner* — Alicia Baturay
(74) *Attorney, Agent, or Firm* — Schiff Hardin LLP

(57) ABSTRACT

A device for processing a plurality of decoding tasks in a network includes an estimator configured to repeatedly estimate a decoder processing usage during decoding the plurality of decoding tasks. The device further includes a task updater configured to update a task execution parameter of a decoding task based on a comparison of the estimated decoder processing usage and a quality of service (QoS) expectation from the network.

16 Claims, 5 Drawing Sheets

QUALITY OF SERVICE-AWARE PROCESSING OF DECODING TASKS

FIELD

The disclosure generally relates to channel decoding by a shared hardware decoding resource, and more specifically to processing a plurality of decoding tasks.

BACKGROUND

Efficient Physical Layer (PHY) network computing in wireless communication technology may rely on efficient resource allocation schemes to improve the flexibility and capacity of the network. Network functions formerly implemented in purpose built hardware are replaced in advanced mobile networks such as, e.g. in 5th generation (5G) networks by software modules operating on shared hardware resources. This imposes a challenge for the operator to maintain the expected quality-of-service (QoS) requirements and/or to avoid that high priority tasks are uncontrollably delayed or eventually dropped.

While previous solutions try to mitigate these problems by identifying worst case scenarios and by dimensioning the amount of hardware resources (e.g. the number of forward error correction (FEC) decoder engines) for the considered worst case scenario, this approach relies on a controversial guess-estimate exercise due to the variety of potential workload corner cases even with low occurrence, and may therefore result costly in over-dimensioning of hardware resources.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
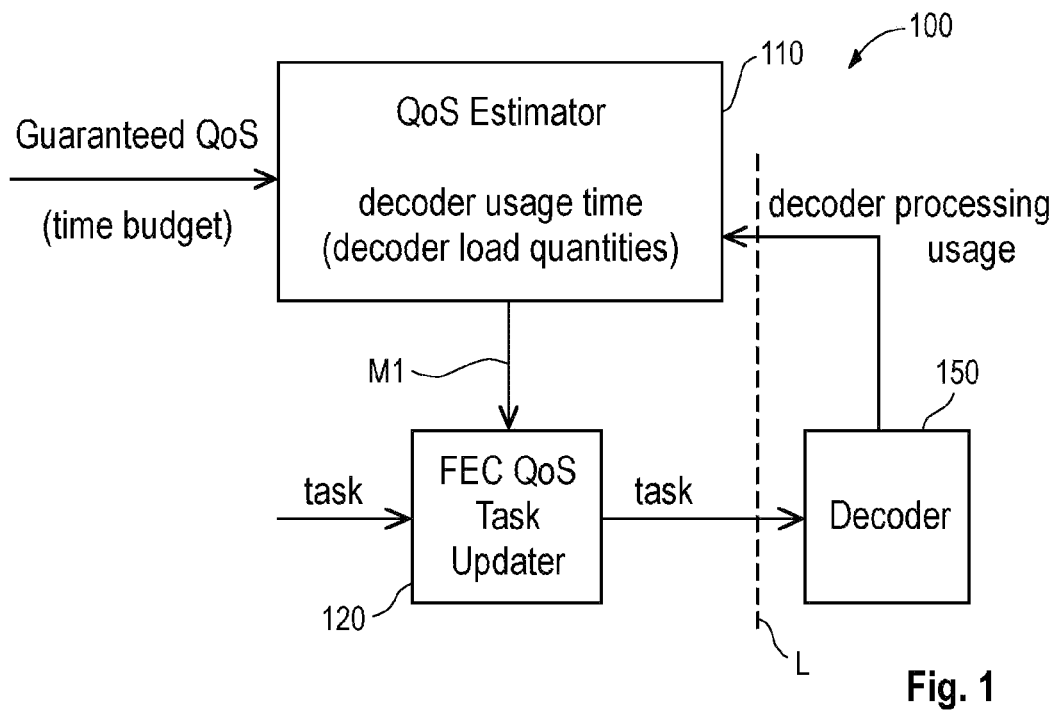
FIG. 1 is a block diagram illustrating an example of a device for processing a plurality of decoding tasks.

In the following detailed description, reference is made to the accompanying drawings, which form a part thereof, and in which is shown by way of illustration specific aspects in which embodiments described herein may be practiced. It is understood that other aspects may be utilized and structural or logical changes may be made without departing from the scope of the present disclosure. The following detailed description, therefore, is not to be taken in a limiting sense, and the scope of the present invention is defined by the appended claims.

It is understood that comments made in connection with a described method or algorithm may also hold true for a corresponding device configured to perform the method or algorithm and vice versa. For example, if a specific method step or algorithm is described, a corresponding device may include a unit to perform the described method step or algorithm, even if such a unit is not explicitly described or illustrated in the figures. Further, it is understood that the features of the various exemplary aspects described herein may be combined with each other, unless specifically noted otherwise.

The techniques, methods and devices described herein may be implemented in wireless communication networks, in particular communication networks based on mobile communication standards such as LTE (Long Term Evolution), the advanced version LTE-A thereof and/or OFDM and successor standards such as 4G, 5G and beyond. The techniques, methods and devices described herein are in particular applicable for cellular mobile networks which support mission critical ultra-reliable low latency communication (uRLLC) services in addition to mobile broadband applications.

The techniques, methods and devices described below may be used for access point and/or base station deployment. They may, e.g., be implemented in electronic devices such as access points and/or base stations.

Embodiments and/or functionality and/or data processing described in this disclosure can be deployed as software or firmware components on computer hardware, e.g. on servers or peripheral component interconnect express (PCIe) devices.

The techniques, methods and devices described hereinafter may be applied in OFDM (Orthogonal Frequency Division Multiplex) systems. OFDM is a scheme for encoding digital data on multiple sub-carrier frequencies. A large number of closely spaced orthogonal sub-carrier signals may be used to carry data.

The techniques, methods and devices described hereinafter are applicable to network architectures including core networks (CNs), radio access networks (RANs) and, logical or virtual networks such as, e.g., network slices that have the capability to provide different telecommunication services and may include RAN and CN.

The techniques, methods and devices described hereinafter are applicable to cellular networks relying on software defined network (SDN) technology and network functions virtualization (NFV). SDN and NFV are now deployed in networks, e.g. 5G networks, to deliver greater network flexibility by allowing traditional network architectures to be partitioned into virtual elements that can be linked also through software.

With NFV, network functions are deployed as modular software components on the hardware. NFV is used to decouple software from hardware. With NFV, service providers can deploy various network functions on virtual machines (VMs). Specifically, NFV enables network slicing, allowing various virtual networks to run on top of a single, physical infrastructure.

SDN relates to a network architecture intended to minimize hardware constraints. A concept of SDN is to abstract lower level functions and move them to a normalized control plane, which manages network behavior through application program interfaces (APIs). From a software-based, centralized control plane, network administrators can provide services through the network.

Network slicing is a form of a logic network architecture using the principles of SDN and NFV in fixed networks. Network slicing allows multiple logical (or virtual) networks to be created on top of a common shared physical infrastructure. Network slicing may primarily be used to partition the CN, but it may also be implemented in the RAN.

The network slices are customized to meet the specific needs of applications, services, devices, customers or operators. In particular, a single physical network may be sliced into multiple logical (or virtual) networks that can support different service types running across a single RAN.

For example, a V2X (vehicle-to-anything) communication for autonomous driving requires low latency but not necessarily a high data throughput. A streaming service (e.g. television) watched while the car is in motion will require a high data throughput but may be susceptible to latency. Both may be delivered over the same common physical network via different network slices, to optimize use of the physical network.

Each network slice may be optimized to provide the resources and network topology for the specific service and traffic that will use the network slice. Each network slice may be completely isolated so that no network slice can interfere with the traffic in another network slice. However, functional components (such as, e.g., FEC decoding devices) may be shared across different network slices and in particular across different traffic flows therein.

FIG. 1 illustrates a block diagram of an exemplary device 100 for processing a plurality of decoding tasks. The device 100 may include a QoS estimator 110 and a FEC QoS task updater 120. The device 100 may be interfaced to a FEC decoder 150, which may represent a FEC decoder hardware resource provided in a cellular network. Such decoder 150 also be deployed in the network as a virtualized accelerator or virtualized machine (VM).

Decoding tasks are input to the FEC QoS task updater 120. As will be described in more detail further below, each decoding task may be associated with a network slice and/or a traffic flow and/or a virtual function (VF). The decoding tasks are provided for being decoded in the decoder 150.

Each decoding task may correspond to one encoded data block. Each data block may be associated with one data flow. One or more data flows may be allocated to a specific VF. In the following, each data block (decoding task) may be associated with a specific agent, where a specific agent can be one of a specific network slice, a specific traffic flow, or a specific virtual function of the network.

Each decoding task may be represented by a structure composed of a plurality of segments of bits. The structure may include one or more segments containing task-related information and at least one segment containing encoded data bits.

At least some of the segments containing task-related information are used to contain task execution parameters. Task execution parameters may, for example, indicate the block size, cyclic redundancy check (CRC) type, lifting factor, base graph (BG), re-transmission index, maximum number of iterations of decoding, threshold for early negative termination of decoding, enforced parallelism of decoding, etc.

The FEC QoS task updater 120 is configured to update a task execution parameter of a decoding task to generate an updated task execution parameter based on a first metric M1 provided by the QoS estimator 110. By way of example, one or more of the task execution parameters maximum "number of iterations of decoding", "threshold for early negative termination of decoding" and "enforced parallelism of decoding" may be changed (updated) by the FEC QoS task updater 120. Other task-related information, e.g. general information about the structure of the task, and/or decoding-specific information such as, e.g. the lifting factor or the base graph, may not be changed (updated).

The decoding task containing the updated task execution parameter(s) is referred to as task' in FIG. 1. Task' is executed by the decoder 150. Executing means that the encoded data bits contained in task' are decoded (or at least tried to be decoded).

Decoder 150 may, e.g., be a low-density parity-check (LDPC) decoder or a turbo decoder. Both LDPC decoder processing and turbo decoder processing rely on iterative decoding, i.e. the encoded data is iteratively processed during the decoding operation. While in LDPC decoding, such iterations are often referred to as believe propagation (BP) iterations, turbo decoding often uses the maximum a posteriori (MAP) algorithm for iterative decoding.

Irrespective of the kind of decoder 150 used, the decoder 150 may be composed of a plurality of decoder engines (not shown in FIG. 1). The number of decoder engines forming the decoder 150 may correspond to the amount of hardware resources provided by the network for executing the decoding tasks. As mentioned before, due to network edge cases and significant variations in the amount of data to be processed by the decoder 150, conventionally it was not possible to appropriately dimension the number of decoder engines (that is to say the amount of hardware that needed to be spent for decoding).

Generally speaking, estimating a priori the decoding time is challenging due to the non-deterministic nature of the decoder algorithm and the vast variety of deployment use cases, which depend not only on traditional block size segmentation but also on code rate or HARQ (hybrid automatic repeat request) re-transmissions (number of edges in the decoder graph, hence highest modulation and coding scheme (MCS) does not necessarily relate to the worst case) and on the high range of possible decoding iterations.

QoS-aware decoding, as described herein, may rely on estimating a decoder processing usage (e.g. a decoder usage time) and comparing the estimated decoder processing usage (e.g. decoder usage time) with a QoS expectation from the network (e.g. a time budget allocated for decoding the plurality of decoding tasks from the plurality of agents).

In various embodiments, the QoS estimator 110 may be configured to receive—or repeatedly or continuously receive—measurements indicative of an actual decoder processing usage and may estimate various quantities based upon these decoder processing usage measurements.

The QoS estimator 110 may, e.g., compute the actual decoder usage time based on the decoder processing usage information received from decoder 150. The decoder usage time is indicative of a time the decoder is used in a current time interval for decoding the decoding tasks across all agents. That is, the decoder usage time may be the estimated time the decoder 150 is operating over the current time interval and, therefore, can also be understood as an estimated duty cycle (i.e. how much time of the time interval the decoder 150 is running).

By way of example, the time interval on which the time budget is based may be the transmit time interval (TTI) of the network. For instance, with an exemplary numerology of 500 μs TTI length, the given time budget expectation may require the decoder processing not to exceed 200 μs. In this case, the time budget of 200 μs is compared with the estimated decoder usage time (i.e. the actual estimated time budget).

The first metric M1, which controls the updating of the task execution parameter, is computed based on this comparison—e.g. on a comparison of the (estimated) decoder usage time and the given time budget allocated for decoding all decoding tasks executed by the decoder 150.

Further, the FEC QoS estimator 110 may be configured to estimate a plurality of decoder load quantities each indicative of a level of decoder processing done for decoding tasks from a specific agent. The decoder load quantities express how much decoder processing is done for each agent.

The decoder load quantities may each be measured by using a sliding window averaging (with a configuration e.g. based on semi static parameters). Each time the processing (execution) of a decoding task is done on any of the decoder engines (there may be several decoder engines running in parallel when the decoding tasks are being dispatched, see FIG. 3), the estimated decoder load quantities are being updated in memory based on the agents (e.g. network slice/traffic flow/VF) the decoding tasks belong to.

The FEC QoS task updater 120 may further be configured to generate the updated task execution parameter based on the estimated decoder load quantity for the agent to which the decoding task belongs and a guaranteed QoS quantity (e.g. guaranteed processing load) for this agent. In this case, the first metric M1 may further be based on a comparison of the estimated decoder load quantity for the decoding task's agent and the guaranteed QoS quantity for the decoding task's agent.

The estimated decoder load quantity for a specific agent may be an estimated bit rate (EBR) actually used by decoding tasks from this specific agent in the decoder 150. As mentioned, the EBR could be measured by using a sliding window technique. The guaranteed QoS quantity (or more specifically guaranteed processing load) for a specific agent may be the guaranteed bit rate (GBR) for decoding tasks from this specific agent. These guaranteed QoS quantities (e.g. GBRs) are provided from higher layers of the network as QoS expectations.

Figure 2:
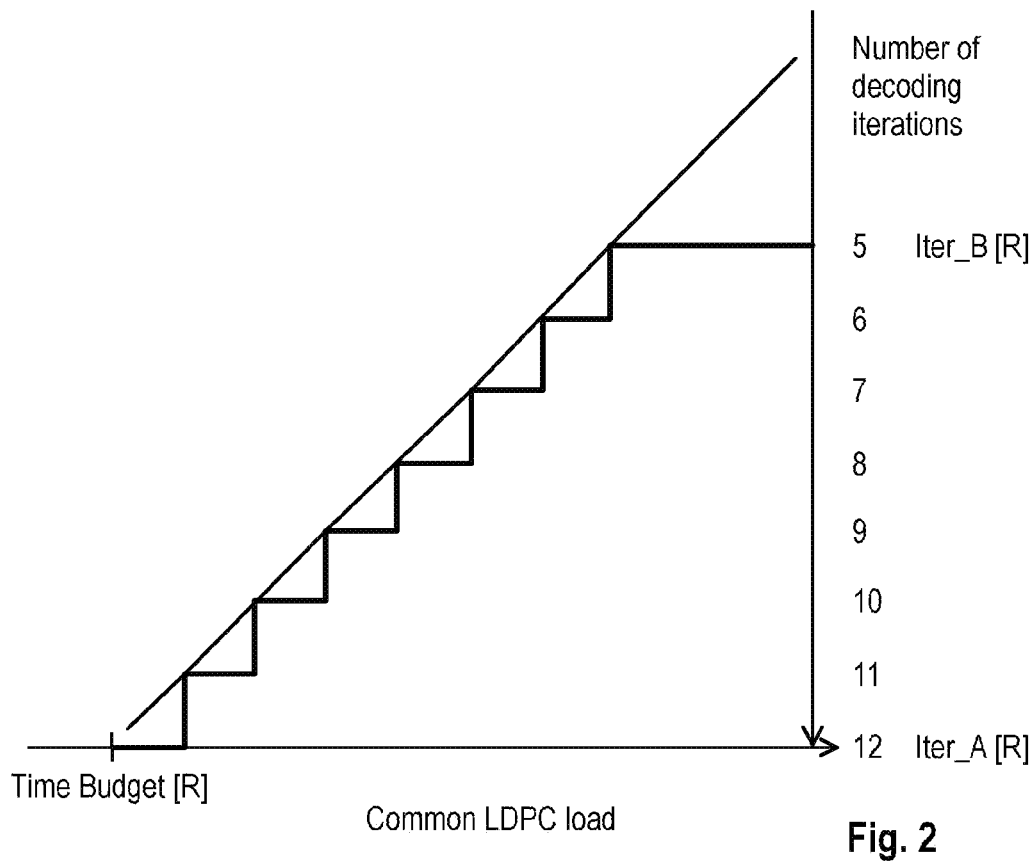
FIG. 2 is a graph illustrating an exemplary updating of a task execution parameter based on a first metric.

FIG. 2 illustrates an example of updating a task execution parameter based on the first metric M1. As an example, the (maximum) number of decoding iterations is used as an exemplary task execution parameter to be updated.

Some pseudo code which could be used for updating the number of decoding iterations may read:

```
If estimatedDecoderUsage < TimeBudget[R]
    QoS_iteration[R] = *no limitation*
Else
    QoS_iteration[R] = max(Iter_B[R], Iter_A[R]-
    (estimatedDecoderUsage-TimeBudget[R])*Fract_step[R])
```

In the pseudo code, estimatedDecoderUsage is the estimated decoder usage time, TimeBudget[R] is the time budget allocated for decoding the plurality of decoding tasks across all agents, QoS_iteration[R] is the (maximum) number of decoding iterations (as an example of the task execution parameter to be updated), Iter_A[R] is a first coefficient (e.g. Iter_A[R]=12 in FIG. 2), ITER_B[R] is a second coefficient (e.g. Iter_B[R]=5 in FIG. 2), and Fract_step[R] is a coefficient relating to a step size.

The quantities followed by [R] may be variable. For instance, R is a variable to cover a number of cases which will have different coefficients TimeBudget[R], Iter_A[R], ITER_B[R], and Fract_step[R] and, as a consequence, different updated QoS_iteration[R]. For instance, R may be used to pick up the following four cases:

R=Case1: the decoding task's agent has not exceeded its GBR.
R=Case2: the decoding task's agent has exceeded its GBR.
R=Case3: the decoding task is not a re-transmission task.
R=Case4: the decoding task is a re-transmission task.

The metric M1 may further change other task execution parameters (and, as a result, other configurations of the decoder 150 which effect the decoder usage time the decoder needs to decode the plurality of decoding tasks).

By way of example, if the estimated decoder usage is less than the time budget, the task execution parameter of the probability for early negative termination may be left unchanged by the first metric M1, else, the probability for early negative termination may be increased by the first metric M1. Increasing the probability for early negative termination means that a channel quality estimator exit criteria is changed. More specifically, a channel quality threshold used as early negative termination criteria is increased such that negative termination of the decoding process occurs "earlier" when channel conditions degrade (i.e. already at better channel conditions).

Further, the first metric M1 may affect the parallelism of the decoding algorithm. If the estimated decoder usage is less than the time budget, the task execution parameter of enforced parallelism may remain unchanged by the first metric M1, else, the enforced parallelism may be increased by the first metric M1. Increasing the enforced parallelism reduces the estimated decoder usage time. On the other hand, less parallelism of the decoding algorithm may have the effect of increasing the first metric M1, and may therefore result in an appropriate reduction of the (maximum) number of decoding iterations (QoS_iteration).

Figure 3:
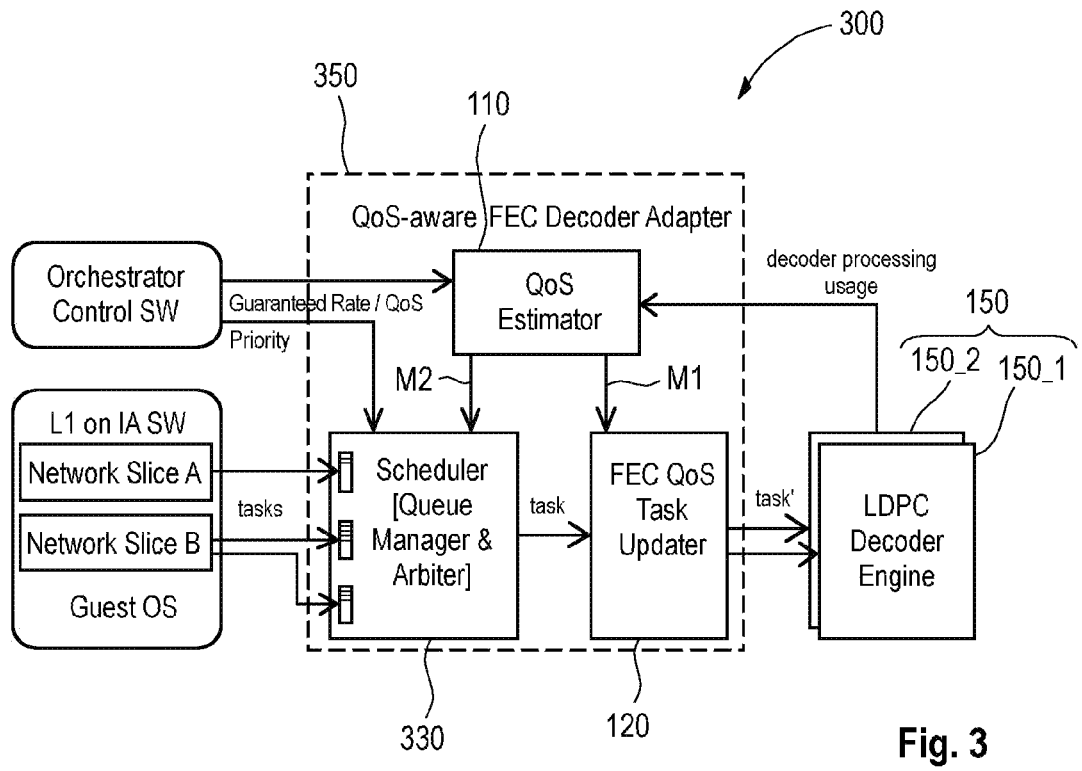
FIG. 3 is a block diagram illustrating an example of a device for processing a plurality of decoding tasks and exemplary network interfaces.

FIG. 3 is a block diagram illustrating an example of a device 300 for processing a plurality of decoding tasks. Similar parts as in FIG. 1 are labelled by the same reference numerals.

The device 300 for processing a plurality of decoding tasks includes the QoS estimator 110 and the FEC QoS task updater 120. Further, the device 300 may include a scheduler 330. The QoS estimator 110, the FEC QoS task updater 120 and the scheduler 330 may represent a QoS-aware FEC decoder adapter 350.

The scheduler 330 receives a plurality of decoding tasks each belonging to one of the plurality of agents (e.g. network slices and/or traffic flows and/or VFs). The decoding tasks on a given agent are provided for decoding by layer 1 (L1) processing. The scheduler 330 is configured to schedule the plurality of decoding tasks based on a second metric M2. The second metric M2 is received from the QoS estimator 110. Further, the scheduler 330 may be configured to schedule the plurality of decoding tasks from the plurality of agents based on a priority information. The priority information may be received, e.g., from an orchestrator or other privileged control software (SW) of the network.

Scheduling of decoding tasks received from the network may include queue management and/or task arbitration.

Each decoder engine 150_1, 150_2, . . . of the decoder 150 may be associated with one or more queues. Thus, scheduling may include determining one or more specific decoder engines 150_1, 150_2, . . . of the decoder 150 for executing each of the decoding tasks, determining one or more queues to which a decoding task is dispatched, arbitrating the order in which the decoding tasks are requested to be run in the decoder engines 150_1, 150_2, . . . , determining a number of queues for a specific agent, and/or determining the number of decoding tasks to be executed in a row of a specific agent. Hence, the scheduler 330 may have the functions of a queue manager and arbiter.

Hence, decoder engines 150_1, 150_2, . . . , will be shared among a number of agents (e.g. network slices and/or traffic flows and/or VFs). For instance there may be different Guest Operating Systems (OS) or containers all having an isolated access to the shared physical engines 150_1, 150_2, . . . . Several L1 stacks may run independently (without knowledge or visibility of other agents) and the arbitration between them is done within the scheduler 330. These agents can be allocated per (guest) OS or for several processes on the same OS. They always may provide isolation between a number of agents which would have a number of tasks to process and different QoS requirements.

The second metric M2 may be a metric per agent. For instance, the second metric M2 may be based on a comparison of the (measured) actual EBR and the GBR for each agent.

The priorities may be defined by the orchestrator or other privileged control software per each agent, e.g. per each network slice (network slice A, network slice B, . . . ) and/or each traffic flow and/or each VF. These priorities are then passed to the scheduler 330. The scheduler 330 may rely both on the second metric M2 and on these priorities for determining one or more of the above mentioned queue management and/or arbitration functions.

In other words, the scheduler 330 may, e.g., determine on the basis of the second metric M2 and on the basis of the priority information which network slice or traffic flow or VF is granted resources from which queue (and thus from which decoder engine 150_1, 150_2, . . . ) and how many decoding tasks of a particular network slice or traffic flow or VF are to be executed in a row.

By way of an example, when VF is used as an exemplary agent without loss of generality, $N_{VF}$ denotes the number of decoding tasks to be executed for a specific VF in a row. $N_{VF}$ may be expressed by $N_{VF}$=factor $w_{VF}^{-1}$.

In this equation the weight $w_{VF}$ allocated to a VF may be expressed, e.g., by $w_{VF}$=M2[VF], with, in this example, M2[VF]=EBR[VF]/GBR[VF] for the VF considered. The factor may either be a constant across all VFs or may depend on the priority information per network slice or per traffic flow or per VF.

The quantity GBR[VF] is indicative of a capacity of a VF to process a number of Mbits over a given period of time (sliding window). As an example, for instance a first VF can process a GBR[VF] of 2 Gbps while a second VF is only guaranteed to process a GBR[VF] of 1 Gbps.

The concept of scheduling decoding tasks according to their priority information, QoS expectations (e.g. GBR) and actual QoS resource load quantities (e.g. EBR) allows to affect a decoding task with lower priority or a decoding task consuming an unfair amount of the shared resources only marginally, while keeping high priority decoding tasks untouched based on their GBR and/or low QoS latency expectation.

Some tasks may require a higher priority network slice/traffic flow/VF to preempt other tasks in a lower priority network slice/traffic flow/VF, for instance when the decoding algorithm requires to do several passes through the iterative decoder 150 or if the network slice/traffic flow/VF is related to uRLLC services. If too many of these decoding tasks are provided and exceed their GBR, then this prioritization may no longer occur.

In other words, the FEC QoS estimator 110 may estimate in real time during the TTI how much data is processed from the decoder engines 150_1, 150_2, . . . (e.g. how much each agent has access to the decoder 150 in terms of EBR and how much of the shared decoder resource is totally used (i.e. across all agents)—these quantities cannot be estimated a priori), compares the EBR with GBR per agent, compares the estimated time budget with the guaranteed time budget, and computes first metrics M1 affecting the decoding task processing and second metrics M2 affecting the decoding task scheduling (e.g. arbitration and queue management).

As an example, if two network agents (e.g. network slices/traffic flows/VFs) provide too many decoding tasks to process but the second has a GBR half of the first one, this second agent will tend over time to see its decoding tasks processed less often. The first agent may complete all its tasks while the second agent has still a number of tasks in queue. Then, once the estimated time budget (estimated decoder usage time) gets close to the allocated time budget, only the decoding tasks of the second agent would be affected.

Such scheduling of incoming tasks based on the agent priority and QoS metrics (e.g. second metric M2) respects fair scheduling. This allows to re-direct the chance of a decoding task not to be completed in time towards decoding tasks either exceeding their GBR or having a low priority. That is, the decoding tasks of the second agent with lower GBR will be impacted relatively more than the decoding tasks of the first agent with higher GBR. Therefore, these decoding tasks of the second agent with lower GBR will end up more likely to be dropped or the performance of these decoding tasks will more likely be decreased.

Figure 4:
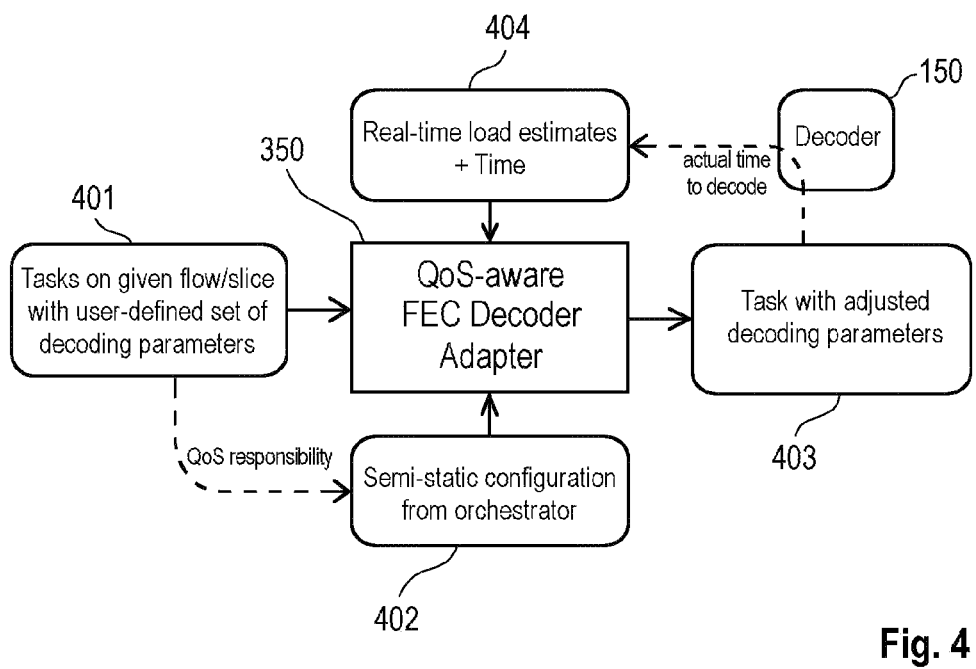
FIG. 4 is a logical diagram illustrating an example of an algorithm for running a device for processing a plurality of decoding tasks.

FIG. 4 illustrates a logical diagram of an algorithm for running a device for processing a plurality of decoding tasks 100, 300. The algorithm may be implemented in a computer program comprising instructions which, when the program is executed by a computer, causes the computer to carry out method and processes as described herein.

In block 401 a number of decoding tasks on a given traffic flow and/or network slice and/or VF is provided for decoding by L1 (PHY) processing. As mentioned above, processing of the decoding tasks may comprise dispatching the decoding tasks to queues of decoder engines of a decoder.

Block 402 illustrates a configuration interface between an orchestrator or other privileged control software and the QoS-aware FEC decoder adapter 350. This configuration interface 402 may tune the algorithm. Tuning the algorithm may include setting input parameters such as, e.g., semi static parameters controlling the configuration of the QoS-aware FEC decoder adapter 350. The dotted arrow between block 401 and block 402 refers to the fact that the information (QoS responsibility) provided from block 401 to block 402 is taken out from layer 1 responsibility, which only provides tasks (see arrow between block 401 and QoS-aware FEC decoder adapter 350) but does not have to consider what other tasks are being run by other processes.

The QoS-aware FEC decoder needs to be configured by the orchestrator or other privileged software to define parameters and priority across each network slice/traffic flow/VF. Hence block 402 may relate to an API (application programming interface) used to expose software to the network as part of a hierarchical software stack. The software can, e.g., be open-sourced through ONAP (Open Network Automation Platform) and/or DPDK (Data plane development Kit) to program the QoS-aware FEC decoder adapter. ONAP is used in Data Center deployment to install and maintain SW on a given HW resource, e.g. a specific chip with accelerators implemented therein. DPDK is the de-facto standard for packet processing and interfacing with accelerators. Both are open source. Once the QoS-aware FEC decoder adapter is equipped with the above described functionality via a defined API, then HW implementations (such as the decoder 150) are expected to make use thereof.

In QoS-aware FEC decoder adapter 350, the decoding tasks are being affected by the algorithm in their order (see scheduler 330) and their nature (see FEC QoS task updater 120) and output to be run on an actual decoder 150 (which does not form part of the devices 100, 300 for processing a plurality of decoding tasks as described above). Block 403 refers to an interface between the QoS-aware FEC decoder adapter 350 and the decoder 150 for passing decoding tasks with adjusted decoding parameters to the decoder 150.

Block 404 relates to the reactive (or feedback) part of the algorithm. The actual decoder processing usage (i.e. the actual decoder usage time and the plurality of real-time decoder load quantities of the decoding tasks actually run on the decoder 150) may be measured repeatedly and at least multiple times on the fly during a TTI, and estimates of these quantities are interfaced through block 404 to the QoS-aware FEC decoder adapter 350. Then, as described above, metrics M1 and/or M2 are derived based on these estimates and used by the algorithm to update the operation (scheduling of decoding tasks, updating of parameters of decoding tasks) of the QoS-aware FEC decoder adapter 350. The estimating to generate the estimates of the above mentioned quantities and the updating (by FEC QoS task updater 120) can be done (nearly) simultaneously and concurrently. Thus, the reactive time of the feedback loop through the decoder 150, the QoS estimator 110, the FEC QoS task updater 120 and/or the scheduler 330 may be much less than the TTI, e.g. less than TTI/N, where N is an integer equal or greater than 2, 10, 100, . . . etc. The reactive time may, e.g., be equal to or shorter than a mean execution time for one or several tasks.

It is to be noted that the task execution parameter updating procedure is reactive rather than predictive in nature. Updating based on a predictive model would be a less viable approach since the number of decoding tasks to be run in the future is unknown a priori. In contrast, the reactive updating procedure approach disclosed herein may be particularly relevant for HW deployment in a virtualized environment where access to shared HW resource is abstracted out and customer may use proprietor products for a variety of undefined deployments which need to be orchestrated gracefully and according to their QoS. Non-initially considered 5G deployments scenarios can be supported with best balance given available HW resources. This provides flexibility for a product with an intended long life span.

Figure 5:
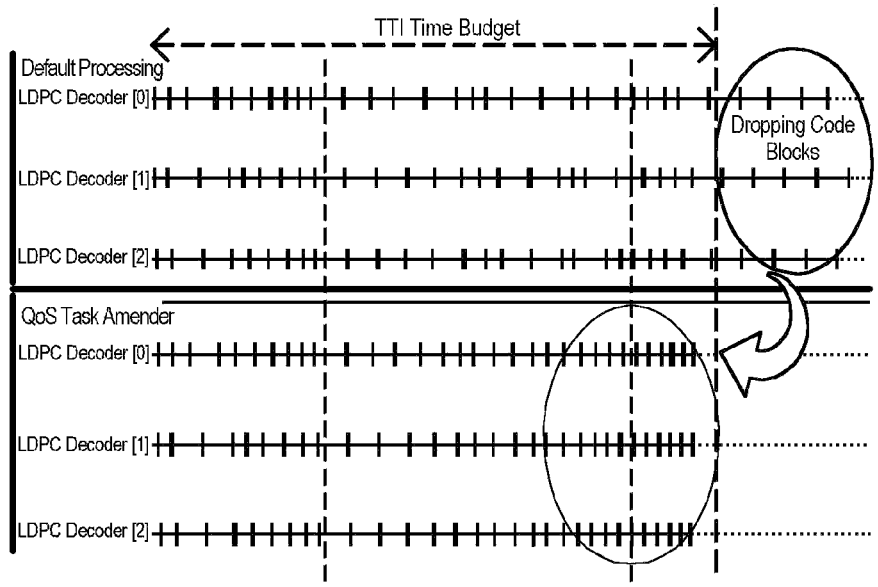
FIG. 5 is an exemplary decoding time diagram illustrating decoding times needed by a plurality of hardware (HW) decoder engines when processing tasks with and without QoS-aware decoding.

FIG. 5 illustrates a decoding time diagram illustrating decoding times needed by, e.g., three LDPC decoder engines (LdpcDecoder[0], LdpcDecoder[1], LdpcDecoder[2]) for executing decoding tasks. The horizontal axes relate to decoder engine processing time, and the vertical partition bars indicate the termination of executing (decoding) a decoding task and the beginning of executing (decoding) the next decoding task dispatched to the respective decoder engine. Further, the time budget available in the TTI ("TTI Time Budget") is indicated in FIG. 5 by a horizontal double arrow.

It is to be noted that instead of LDPC decoder engines, turbo decoder engines or a mix of LDPC decoder engines and turbo decoder engines could be used. Analogously, the operation of the QoS-enforced FEC decoder adapter 350 (scheduling of decoding tasks, updating of parameters of decoding tasks) may relate to decoding tasks for LDPC decoding and/or turbo decoding. However, LDPC decoder latency as illustrated in FIG. 5 based on different code rates, block sizes, base graphs, lifting factors or HARQ combining, etc., is less deterministic than turbo decoder latency.

Conventional processing ("Default Processing") of the three decoder engines is illustrated in the top of FIG. 5, while processing using the FEC QoS task updater 120 ("QoS Task Amender") is illustrated below. As apparent from FIG. 5, dropping of code blocks (i.e. decoding tasks) can be avoided by using the FEC QoS task updater 120. In this example, the task execution parameter updated by the FEC QoS task updater 120 was the maximum number of decoding iterations.

Figure 6:
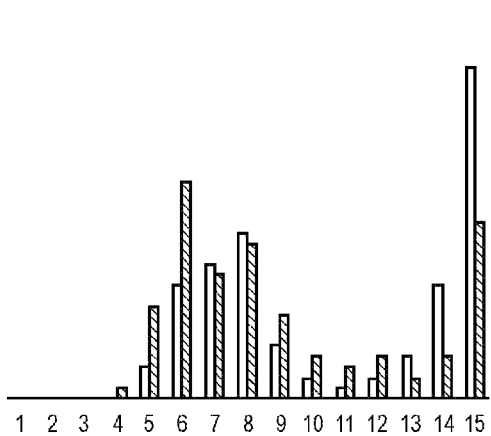
FIG. 6 is an exemplary graph illustrating a decoding iteration number distribution when processing tasks with and without QoS-aware decoding.

FIG. 6 shows a distribution of decoding iteration numbers when processing decoding tasks with QoS-aware decoding ("QoS Task Amender") and without QoS-aware decoding ("Default Processing"). FIG. 6 illustrates that the average number of decoding iterations decreases. Further, the probability of highly time consuming decoding tasks using the maximum number of 15 iterations is significantly reduced.

Figure 7:
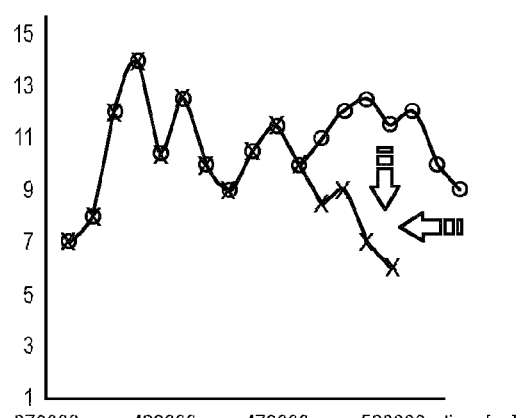
FIG. 7 is an exemplary graph illustrating the movement of a decoding iteration number average when processing tasks with and without QoS-aware decoding.

FIG. 7 shows the movement of a decoding iteration number average when processing decoding tasks with QoS-aware decoding ("QoS Task Amender") and without QoS-aware decoding ("Default Processing"). This shows that in the case where task parameter updating is used and too many decoding tasks have to be processed, the number of iterations used for the last tasks will be reduced. This means these last decoding tasks will degrade in performance (arrow from high to low as the number of iterations is reduced) but the total time for completion will be reduced (arrow from right to left).

Figure 8:
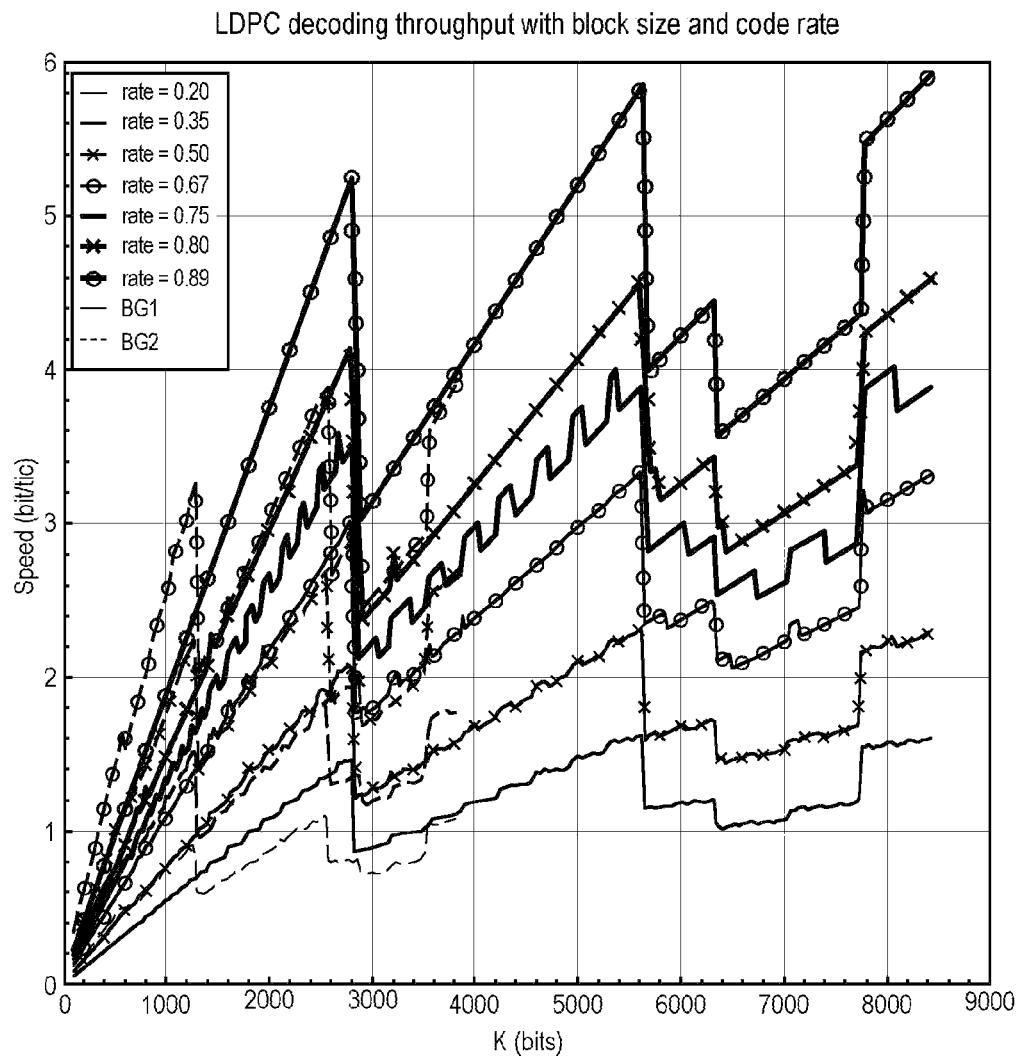
FIG. 8 is an exemplary graph illustrating the decoding throughput versus block size for a variety of code rates.

FIG. 8 illustrates by way of example the LDPC decoding throughput (in bits per tic) versus block size K for a variety of code rates and LDPC codes of different base graphs (BG), namely BG1 and BG2. As apparent from FIG. 8, there is in practice a large variation in processing speed and therefore processing latency depending on the variable nature of the tasks to be processed for different cells in parallel. This makes the dimensioning of virtualized accelerators (e.g. FEC decoder engines) in the network rather difficult (some use cases may end up ten times more demanding than similar other ones), and hence makes the concept describe herein of handling the decoding tasks by dynamically adjusting the task's execution parameters (e.g. the number of iterations, etc.) on the fly in 5G networks more valuable compared to 4G networks.

Figure 9:
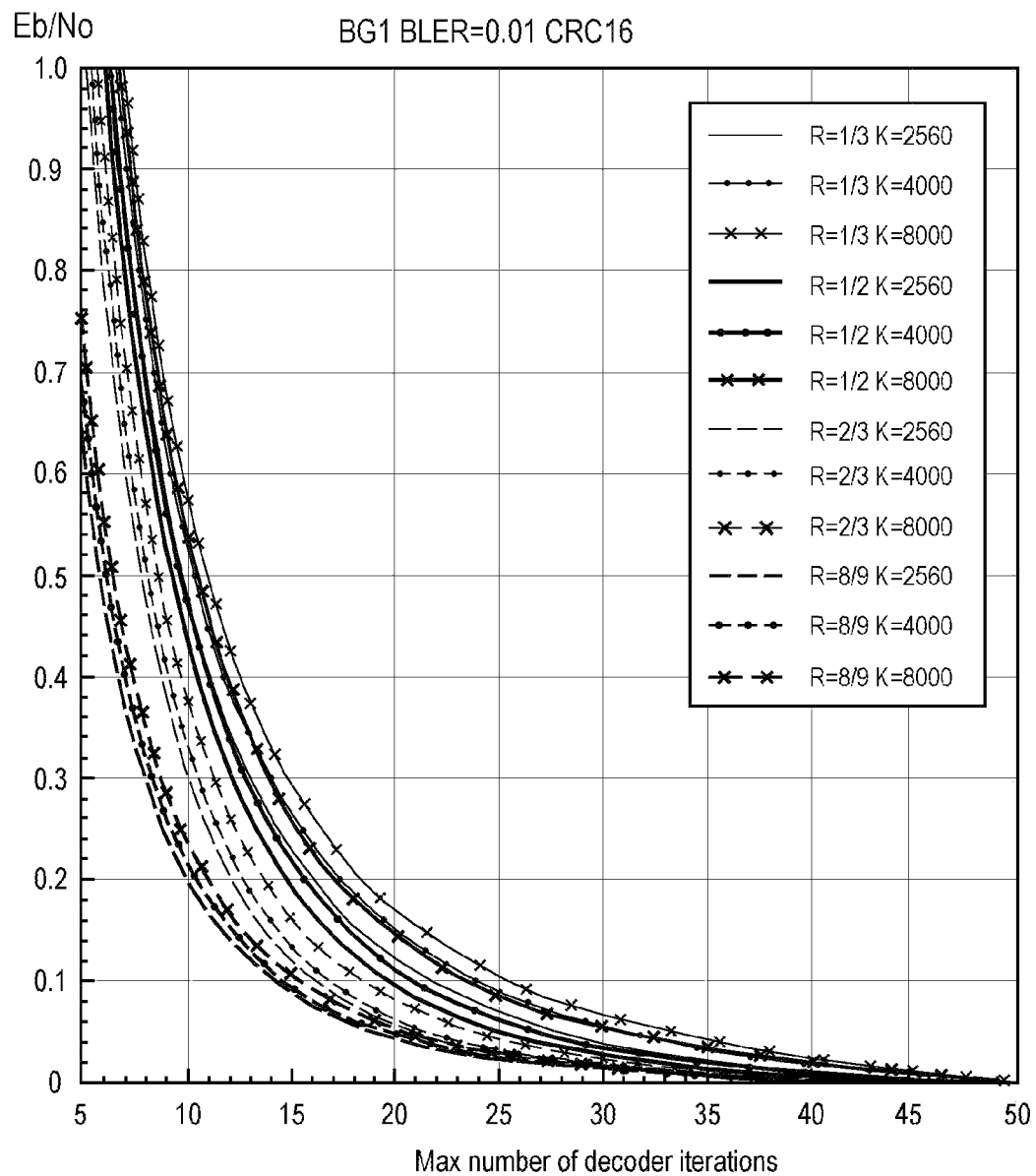
FIG. 9 is an exemplary graph illustrating the effect of maximum number of decoder iterations on the required energy per bit to noise power spectral density ratio (Eb/No).

FIG. 9 illustrates the dependency of the required energy per bit to noise power spectral density ratio (Eb/No) from the maximum number of decoder iterations for different code rates R and different block sizes K at a given block error rate (BLER) of 0.01 for CRC-16 and LDPC BG1 codes. Eb/No may be strongly dependent on the dynamically adjusted task execution parameter (here, e.g., the maximum number of decoder iterations).

EXAMPLES

The following examples pertain to further embodiments. Example 1 is a device for processing a plurality of decoding tasks in a network, comprising: an estimator configured to estimate or to repeatedly or continuously estimate a decoder processing usage during decoding the plurality of decoding tasks; and a task updater configured to update a task execution parameter of a decoding task based on a comparison of the estimated decoder processing usage and a quality of service (QoS) expectation from the network.

In Example 2, the subject matter of Example 1 can optionally include that the task execution parameter is one or more of a maximum number of iterations of decoding, a threshold for early negative termination of decoding and an enforced parallelism of decoding.

In Example 3, the subject matter of any one of Examples 1-2 can optionally include that the decoder processing usage comprises a decoder usage time indicative of a time the decoder is used in a current time interval for decoding the plurality of decoding tasks.

In Example 4, the subject matter of Example 3 can optionally include that the QoS expectation comprises a time budget allocated for decoding the plurality of decoding tasks, and the task updater is configured to update the task execution parameter of the decoding task based on a comparison of the estimated decoder usage time and the time budget.

In Example 5, the subject matter of any one of Examples 3-4 can optionally include that the decoder processing usage further comprises a plurality of decoder load quantities each indicative of a level of decoder processing done for decoding tasks from a specific agent.

In Example 6, the subject matter of Example 5 can optionally include that the estimator is configured to estimate the plurality of decoder load quantities by using sliding window averaging.

In Example 7, the subject matter of any one of Examples 5-6 can optionally include that the QoS expectation further comprises a guaranteed processing load for each specific agent, and the task updater is configured to update the task execution parameter of the decoding task based further on the estimated decoder load quantity for the specific agent to which the decoding task belongs and the guaranteed processing load for the specific agent.

In Example 8, the subject matter of any one of Examples 5-7 can optionally include that the specific agent is one of a specific network slice, a specific traffic flow, or a specific virtual function of the network.

In Example 9, the subject matter of any one of Examples 1-8 can optionally include that the task updater is configured to update the task execution parameter based further on a re-transmission status of the decoding task to be decoded.

In Example 10, the subject matter of any one of Examples 5-9 can optionally include that the QoS expectation further comprises a guaranteed processing load for each specific agent, the device further comprising: a scheduler configured to schedule the plurality of decoding tasks based on a comparison of the estimated decoder load quantity for the specific agent to which the decoding task belongs and the guaranteed processing load for the specific agent.

In Example 11, the subject matter of Example 5 can optionally include that 1. The device of claim 10, wherein the scheduler is configured to perform weighted round robin scheduling, wherein a weight associated with a specific agent is computed based on a ratio of the estimated decoder load quantity for the specific agent and the guaranteed QoS quantity for the specific agent.

In Example 12, the subject matter of Example 11 can optionally include that the scheduler is configured to determine a number of decoding tasks from the specific agent for being processed in a row based on the weight associated with the specific agent.

Example 13 is a method of processing a plurality of decoding tasks in a network, comprising: estimating a decoder processing usage during decoding the plurality of decoding tasks; and updating a task execution parameter of a decoding task based on a comparison of the estimated decoder processing usage and a quality of service (QoS) expectation from the network.

In Example 14, the subject matter of Example 13 can optionally include that the task execution parameter is one or more of a maximum number of iterations of decoding, a threshold for early negative termination of decoding and an enforced parallelism of decoding.

In Example 15, the subject matter of any one of Examples 13-14 can optionally include that the decoder processing usage comprises a decoder usage time indicative of a time the decoder is used in a current time interval for decoding the plurality of decoding tasks.

In Example 16, the subject matter of Example 15 can optionally include that the QoS expectation comprises a time budget allocated for decoding the plurality of decoding tasks, and updating the task execution parameter of the decoding task is based on a comparison of the estimated decoder usage time and the time budget.

In Example 17, the subject matter of any one of Examples 15-16 can optionally include that the decoder processing usage further comprises a plurality of decoder load quantities each indicative of a level of decoder processing done for decoding tasks from a specific agent.

In Example 18, the subject matter of Example 17 can optionally include estimating the plurality of decoder load quantities uses sliding window averaging.

In Example 19, the subject matter of any one of Examples 17-18 can optionally include that the QoS expectation further comprises a guaranteed processing load for each specific agent, and updating the task execution parameter of the decoding task is based further on the estimated decoder load quantity for the specific agent to which the decoding task belongs and the guaranteed processing load for the specific agent.

In Example 20, the subject matter of any one of Examples 17-19 can optionally include that the specific agent is one of a specific network slice, a specific traffic flow, or a specific virtual function of the network.

In Example 21, the subject matter of any one of Examples 13-20 can optionally include that updating the task execution parameter is based further on a re-transmission status of the decoding task to be decoded.

In Example 22, the subject matter of any one of Examples 17-21 can optionally include that the QoS expectation further comprises a guaranteed processing load for each specific agent, the method further comprising: scheduling the plurality of decoding tasks based on a comparison of the estimated decoder load quantity for the specific agent to which the decoding task belongs and the guaranteed processing load for the specific agent.

In Example 23, the subject matter of Example 22 can optionally include that scheduling comprises weighted round robin scheduling, wherein a weight associated with a specific agent is computed based on a ratio of the estimated decoder load quantity for the specific agent and the guaranteed QoS quantity for the specific agent.

In Example 24, the subject matter of Example 23 can optionally include that scheduling comprises determining a number of decoding tasks from the specific agent for being processed in a row based on the weight associated with the specific agent.

In Example 25, the subject matter of any one of Examples 13-24 can optionally include that updating comprise updating the estimated decoder load quantity for a specific agent each time a decoding task from the specific agent has been executed.

Example 26 is a computer readable non-transitory medium on which computer instructions are stored which, when executed by a computer, cause the computer to perform the method of any one of Examples 13-25.

Example 27 is a data processing apparatus comprising means for carrying out the method of any one of Examples 13-25.

Example 28 is a computer program comprising instructions which, when the program is executed by a computer, causes the computer to carry out the method of any one of Examples 13-25.

Example 29 is a device for processing a plurality of decoding tasks from different agents, comprising: an estimator configured to estimate a decoder usage time indicative of a time a decoder is used in a current time interval for decoding the plurality of decoding tasks from different agents, and to estimate a plurality of decoder load quantities each indicative of a level of decoder processing done for a specific agent; and a task updater configured to update a task execution parameter of a decoding task to generate an updated task execution parameter based on a comparison of the estimated decoder usage time and a time budget allocated for decoding the plurality of decoding tasks from the different agents.

In Example 30, the subject matter of Example 29 can optionally include that the task execution parameter is one or more of a maximum number of iterations of decoding, a threshold for early negative termination of decoding and enforced parallelism of decoding.

In Example 31, the subject matter of any one of Examples 29-30 can optionally include that the task updater is configured to generate the updated task execution parameter based further on the estimated decoder load quantity for the specific agent to which the decoding task belongs and a guaranteed processing load for the specific agent.

In Example 32, the subject matter of Example 31 can optionally include that the estimated decoder load quantity is an estimated bit rate and the guaranteed processing load is a guaranteed bit rate.

In Example 33, the subject matter of any one of Examples 29-32 can optionally include that the task updater is configured to generate the updated task execution parameter based further on a re-transmission status of the decoding task.

In Example 34, the subject matter of any one of Examples 29-33 can optionally include a scheduler configured to schedule the plurality of decoding tasks from different agents based on a comparison of the estimated decoder load quantity for the specific agent to which the decoding task belongs and a guaranteed processing load for the specific agent.

In Example 35, the subject matter of Example 34 can optionally include that the scheduler is further configured to schedule the plurality of decoding tasks based on a priority information.

In Example 36, the subject matter of any one of Examples 34-35 can optionally include that the scheduler is configured to perform weighted round robin scheduling, wherein a weight associated with a specific agent is computed based on a ratio of the estimated decoder load quantity for the specific agent and a guaranteed processing load for the specific agent.

In Example 37, the subject matter of Example 36 can optionally include that a number of decoding tasks from the specific agent for being processed in a row is based on the weight associated with the specific agent.

In Example 38 the subject matter of any one of Examples 29-37 can optionally include that the estimator is configured to estimate the plurality of decoder load quantities by using sliding window averaging.

In Example 39 the subject matter of any one of Examples 29-38 can optionally include that the estimator is configured to update the estimated decoder load quantity for a specific agent each time a decoding task from the specific agent has been executed.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A device for processing a plurality of decoding tasks in a network, comprising:
    an estimator configured to repeatedly estimate a decoder processing usage during decoding the plurality of decoding tasks, wherein the decoder processing usage comprises a decoder usage time indicative of a time the decoder is used in a current time interval for decoding the plurality of decoding tasks, and comprises a plurality of decoder load quantities each indicative of a level of decoder processing done for decoding tasks from a specific agent; and
    a task updater configured to update a task execution parameter of a decoding task based on a comparison of the estimated decoder processing usage and a quality of service (QoS) expectation from the network.

2. The device of claim 1, wherein the task execution parameter is one or more of a maximum number of iterations of decoding, a threshold for early negative termination of decoding and an enforced parallelism of decoding.

3. The device of claim 1, wherein the QoS expectation comprises a time budget allocated for decoding the plurality of decoding tasks, and the task updater is configured to update the task execution parameter of the decoding task based on a comparison of the estimated decoder usage time and the time budget.

4. The device of claim 1, wherein the estimator is configured to estimate the plurality of decoder load quantities by using sliding window averaging.

5. The device of claim 1, wherein the QoS expectation further comprises a guaranteed processing load for each specific agent, and the task updater is configured to update the task execution parameter of the decoding task based further on the estimated decoder load quantity for the specific agent to which the decoding task belongs and the guaranteed processing load for the specific agent.

6. The device of claim 1, wherein the specific agent is one of a specific network slice, a specific traffic flow, or a specific virtual function of the network.

7. The device of claim 1, wherein the task updater is configured to update the task execution parameter based further on a re-transmission status of the decoding task to be decoded.

8. The device of claim 1, wherein the QoS expectation further comprises a guaranteed processing load for each specific agent, the device further comprising:
   a scheduler configured to schedule the plurality of decoding tasks based on a comparison of the estimated decoder load quantity for the specific agent to which the decoding task belongs and the guaranteed processing load for the specific agent.

9. The device of claim 8, wherein the scheduler is configured to perform weighted round robin scheduling, wherein a weight associated with a specific agent is computed based on a ratio of the estimated decoder load quantity for the specific agent and the guaranteed QoS quantity for the specific agent.

10. The device of claim 9, wherein the scheduler is configured to determine a number of decoding tasks from the specific agent for being processed in a row based on the weight associated with the specific agent.

11. A method of processing a plurality of decoding tasks in a network, comprising:
   estimating a decoder processing usage during decoding the plurality of decoding tasks, wherein the decoder processing usage comprises a decoder usage time indicative of a time the decoder is used in a current time interval for decoding the plurality of decoding tasks, and comprise a plurality of decoder load quantities each indicative of a level of decoder processing done for decoding tasks from a specific agent; and
   updating a task execution parameter of a decoding task based on a comparison of the estimated decoder processing usage and a quality of service (QoS) expectation from the network.

12. The method of claim 11, wherein the task execution parameter is one or more of a maximum number of iterations of decoding, a threshold for early negative termination of decoding and an enforced parallelism of decoding.

13. The method of claim 11, wherein the QoS expectation comprises a time budget allocated for decoding the plurality of decoding tasks, and updating the task execution parameter of the decoding task is based on a comparison of the estimated decoder usage time and the time budget.

14. The method of claim 11, wherein estimating the plurality of decoder load quantities uses sliding window averaging.

15. The method of claim 11, wherein the QoS expectation further comprises a guaranteed processing load for each specific agent, and updating the task execution parameter of the decoding task is based further on the estimated decoder load quantity for the specific agent to which the decoding task belongs and the guaranteed processing load for the specific agent.

16. A computer readable non-transitory medium on which computer instructions are stored which when executed by a computer cause the computer to perform the method of claim 11.

* * * * *